US007962595B1

(12) United States Patent
Jabbar

(10) Patent No.: US 7,962,595 B1
(45) Date of Patent: Jun. 14, 2011

(54) METHOD AND APPARATUS FOR DIAGNOSING HOST TO STORAGE DATA PATH LOSS DUE TO FIBRECHANNEL SWITCH FABRIC SPLITS

(75) Inventor: Ameer Jabbar, Lilburn, GA (US)

(73) Assignee: EMC Corporation, Hopkinton, MA (US)

(*) Notice: Subject to any disclaimer, the term of this patent is extended or adjusted under 35 U.S.C. 154(b) by 610 days.

(21) Appl. No.: 11/725,882

(22) Filed: Mar. 20, 2007

(51) Int. Cl.
*G06F 15/173* (2006.01)
*H04L 12/28* (2006.01)
(52) U.S. Cl. ......................................... 709/223; 370/254
(58) Field of Classification Search .................... 709/223
See application file for complete search history.

(56) References Cited

U.S. PATENT DOCUMENTS

| | | | | |
|---|---|---|---|---|
| 4,555,781 A * | 11/1985 | Baldry et al. | ................. | 370/260 |
| 5,084,816 A * | 1/1992 | Boese et al. | ........................ | 714/4 |
| 5,430,729 A * | 7/1995 | Rahnema | ...................... | 370/409 |
| 5,491,690 A * | 2/1996 | Alfonsi et al. | ................. | 370/404 |
| 5,606,669 A * | 2/1997 | Bertin et al. | ..................... | 709/223 |
| 5,914,939 A * | 6/1999 | Serkowski | ......................... | 370/254 |
| 5,941,955 A * | 8/1999 | Wilby et al. | .................... | 709/242 |
| 6,061,735 A * | 5/2000 | Rogers | ........................... | 709/239 |
| 6,122,664 A * | 9/2000 | Boukobza et al. | ............. | 709/224 |
| 6,219,739 B1 * | 4/2001 | Dutt et al. | ....................... | 710/311 |
| 6,330,229 B1 * | 12/2001 | Jain et al. | ........................ | 370/256 |
| 6,400,681 B1 * | 6/2002 | Bertin et al. | .................... | 370/218 |
| 6,654,802 B1 * | 11/2003 | Oliva et al. | ..................... | 709/224 |
| 6,781,960 B1 * | 8/2004 | Charas | .......................... | 370/255 |
| 7,239,618 B1 * | 7/2007 | La Porta et al. | ............... | 370/331 |
| 7,680,031 B1 * | 3/2010 | Luft et al. | ...................... | 370/222 |
| 7,725,859 B1 * | 5/2010 | Lenahan et al. | ................ | 716/11 |
| 7,778,970 B1 * | 8/2010 | Caronni et al. | ............... | 707/616 |
| 2001/0021177 A1 * | 9/2001 | Ishii | ............................... | 370/256 |
| 2001/0034853 A1 * | 10/2001 | Takatama et al. | .................. | 714/4 |
| 2002/0067693 A1 * | 6/2002 | Kodialam et al. | ............. | 370/238 |
| 2002/0147800 A1 * | 10/2002 | Gai et al. | ........................ | 709/221 |
| 2003/0165117 A1 * | 9/2003 | Garcia-Luna-Aceves et al. | ............................. | 370/238 |
| 2003/0193959 A1 * | 10/2003 | Lui et al. | ........................ | 370/401 |
| 2004/0047300 A1 * | 3/2004 | Enomoto et al. | ............... | 370/256 |
| 2004/0076164 A1 * | 4/2004 | Vanderveen et al. | ......... | 370/400 |
| 2004/0153568 A1 * | 8/2004 | Ho et al. | ........................ | 709/238 |

(Continued)

OTHER PUBLICATIONS

IEEE Standard 802.1D, Local and metropolitan area networks—Media Access Control (MAC) Bridges (Jun. 2004).*

(Continued)

*Primary Examiner* — Rupal D Dharia
*Assistant Examiner* — Robert Shaw
(74) *Attorney, Agent, or Firm* — Krishnendu Gupta; Joseph D'Angelo

(57) ABSTRACT

A method, apparatus and computer-program product for determining the status of a connection among a plurality of elements in a distributed system is disclosed. The method comprising the steps of determining an initial configuration of the connections among selected ones of the plurality of elements as a relationship of one of said selected elements to another of said elements, wherein at least one of said relationships is associated with a root element of an associated connection, responsive to a stimulus, determining a second configuration of the connections among the selected elements, determining a current condition of the connections among the selected elements is based on at least the second configuration; and providing an indication when at least a significant change has occurred. The device discloses, in one aspect, a processor executing code for implementing the method steps described and the computer product providing code to a processor for implementing the method steps described.

17 Claims, 14 Drawing Sheets

U.S. PATENT DOCUMENTS

| | | | | |
|---|---|---|---|---|
| 2004/0156310 | A1* | 8/2004 | Fredette et al. | 370/216 |
| 2004/0160904 | A1* | 8/2004 | Enomoto et al. | 370/256 |
| 2004/0221027 | A1* | 11/2004 | Parrott | 709/223 |
| 2005/0083834 | A1* | 4/2005 | Dunagan et al. | 370/221 |
| 2005/0114551 | A1* | 5/2005 | Basu et al. | 709/249 |
| 2005/0254429 | A1* | 11/2005 | Kato et al. | 370/238 |
| 2006/0071684 | A1* | 4/2006 | Schwarz et al. | 326/39 |
| 2006/0101214 | A1* | 5/2006 | Mikami | 711/162 |
| 2006/0104210 | A1* | 5/2006 | Nielsen | 370/248 |
| 2006/0133366 | A1* | 6/2006 | Ho et al. | 370/389 |
| 2006/0136931 | A1* | 6/2006 | Sever et al. | 719/313 |
| 2007/0189165 | A1* | 8/2007 | Johnson et al. | 370/230 |
| 2007/0286087 | A1* | 12/2007 | Compton et al. | 370/242 |
| 2008/0137580 | A1* | 6/2008 | Axelsson et al. | 370/315 |
| 2008/0316917 | A1* | 12/2008 | Farkas et al. | 370/221 |

OTHER PUBLICATIONS

IEEE Standard 802.1w-2001 Local and metropolitan area networks—Part 3: Media Access Control (MAC) Bridges—Amendment 2: Rapid Reconfiguration (Jul. 2001).*

Managing Your Network with HP OpenView Network Node Manager, Hewlett-Packard Company (Nov. 1998).*

R. Sedgewick, Algorithms in C++. Parts 1-4 Addison Wesley, Third Edition, Fundamentals, Data Structures, Sorting, Searching (1998).*

R. Sedgewick, Algorithms in Java, Third Edition, Parts 1-4: Fundamentals, Data Structures, Sorting, Searching (2002).*

R. Sedgewick—Case Study—Union Find—java code (2002) UnionFind java code—http://www.cs.princeton.edu/algs4/15uf/UF.java.html.*

Galil & Italiiano, Data Structures and Algorithms for Disjoint Set Union Problems, ACM Computing Surveys, vol. 23, No. 2, Sep. 1991, p. 319-344.*

Galil & Italiano Fully Dynamic Algorithms for Edge Connectivity Problems, Annual ACM Symposium on Theory of Computing Proceedings of the twenty-third annual ACM symposium on Theory of computing (1991).*

Roditty & Zwick, "A Fully Dynamic Reachability Algorithm for Directed Graphs with an Almost Linear Update Time", ACM 1-58113-852-0/04/0006 (2004), pp. 184-191.*

Roditty & Zwick, Improved dynamic reachability algorithms for directed graphs, The 43rd Annual IEEE Symposium on Foundations of Computer Science (FOCS'02), Vancouver, BC, CA (2002).*

Roditty & Zwick, On Dynamic Shortest Paths Problems, ESA 2004 Lecture Notes in Computer Science, 2004, vol. 3221/2004.*

Nardelli et al , Nearly Linear Time Minimum Spanning Tree Maintenance for Transient Node Failures, Algorithmica (2004) 40:119-132.*

R. Sedgewick, Algorithms in Java, Fundamentals, data structures, sorting, searching (2003).*

* cited by examiner

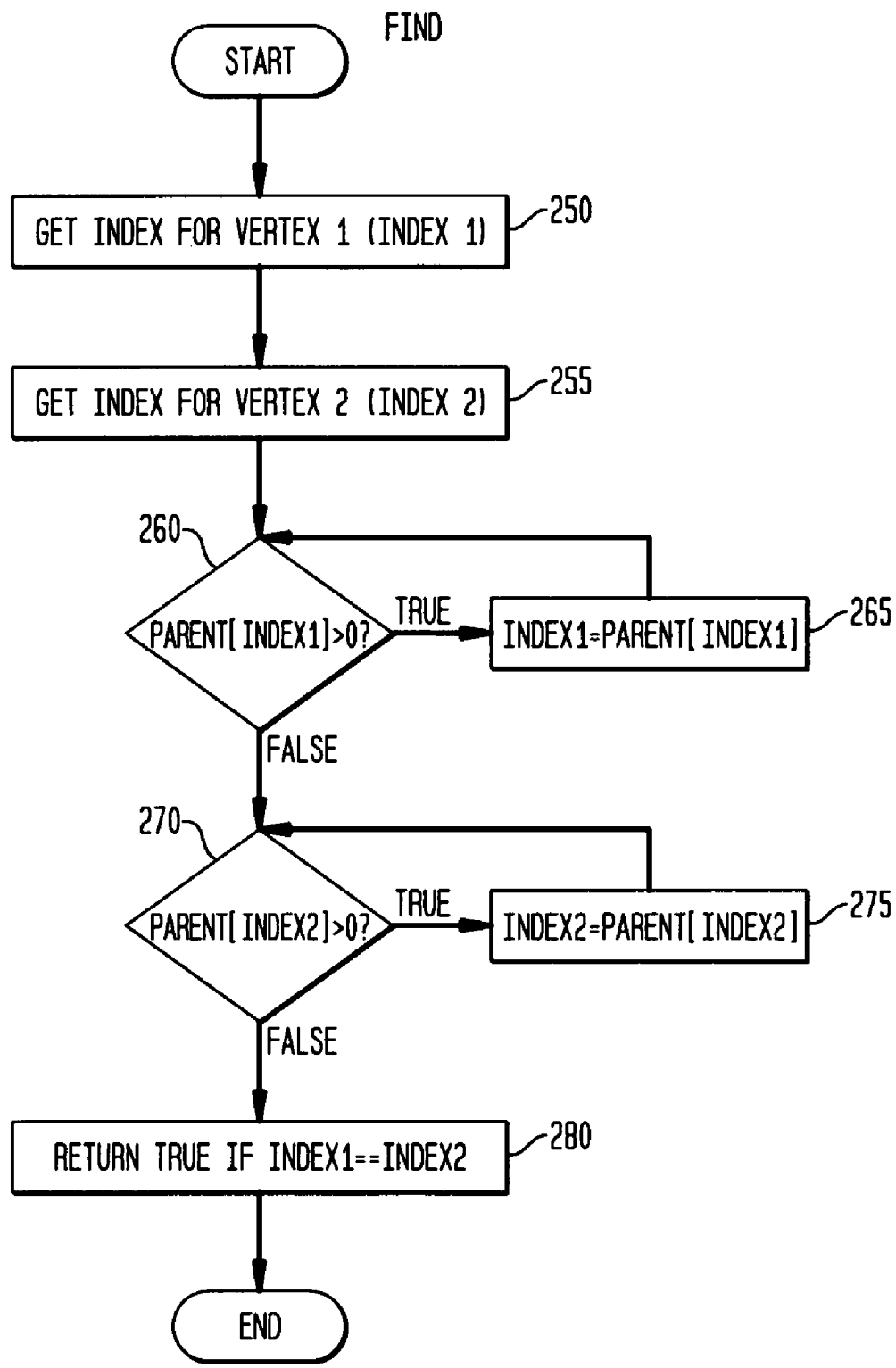

EDGES: {AB, AC, BA, BC, BD, CA, CB, DE, ED}

| UNION (X:Y) | A=1 | B=2 | C=3 | D=4 | E=5 |
|---|---|---|---|---|---|
| UNION (A:B) | 0 | 1 | 0 | 0 | 0 |
| UNION (A:C) | 0 | 1 | 1 | 0 | 0 |
| UNION (B:A) | 0 | 1 | 1 | 0 | 0 |
| UNION (B:C) | 0 | 1 | 1 | 0 | 0 |
| UNION (B:D) | 0 | 1 | 1 | 1 | 0 |
| UNION (C:A) | 0 | 1 | 1 | 1 | 0 |
| UNION (C:B) | 0 | 1 | 1 | 1 | 0 |
| UNION (D:E) | 0 | 1 | 1 | 1 | 1 |
| UNION (E:D) | 0 | 1 | 1 | 1 | 1 |

EDGES: {AB, AC, BA, BC, CA, CB, DE, ED}

| UNION (X:Y) | A=1 | B=2 | C=3 | D=4 | E=5 |
|---|---|---|---|---|---|
| UNION (A:B) | 0 | 1 | 0 | 0 | 0 |
| UNION (A:C) | 0 | 1 | 1 | 0 | 0 |
| UNION (B:A) | 0 | 1 | 1 | 0 | 0 |
| UNION (B:C) | 0 | 1 | 1 | 0 | 0 |
| UNION (C:A) | 0 | 1 | 1 | 0 | 0 |
| UNION (C:B) | 0 | 1 | 1 | 0 | 0 |
| UNION (D:E) | 0 | 1 | 1 | 0 | 4 |
| UNION (E:D) | 0 | 1 | 1 | 0 | 4 |

| UNION (X:Y) | A=1 | B=2 | C=3 | D=4 | E=5 | F=6 | G=7 | H=8 | I=9 |
|---|---|---|---|---|---|---|---|---|---|
| UNION (A:B) | 0 | 0 | 0 | 1 | 0 | 0 | 0 | 0 | 0 |
| UNION (A:E) | 0 | 0 | 0 | 1 | 1 | 0 | 0 | 0 | 0 |
| UNION (B:D) | 2 | 0 | 0 | 1 | 1 | 0 | 0 | 0 | 0 |
| UNION (B:E) | 2 | 0 | 0 | 1 | 1 | 0 | 0 | 0 | 0 |
| UNION (C:D) | 2 | 3 | 0 | 1 | 1 | 0 | 0 | 0 | 0 |
| UNION (C:E) | 2 | 3 | 0 | 1 | 1 | 0 | 0 | 0 | 0 |
| UNION (D:E) | 2 | 3 | 0 | 1 | 1 | 0 | 0 | 0 | 0 |
| UNION (D:F) | 2 | 3 | 0 | 1 | 1 | 3 | 0 | 0 | 0 |
| UNION (D:G) | 2 | 3 | 0 | 1 | 1 | 3 | 3 | 0 | 0 |
| UNION (D:H) | 2 | 3 | 0 | 1 | 1 | 3 | 3 | 3 | 0 |
| UNION (E:F) | 2 | 3 | 0 | 1 | 1 | 3 | 3 | 3 | 0 |
| UNION (E:G) | 2 | 3 | 0 | 1 | 1 | 3 | 3 | 3 | 0 |
| UNION (E:H) | 2 | 3 | 0 | 1 | 1 | 3 | 3 | 3 | 0 |
| UNION (G:I) | 2 | 3 | 0 | 1 | 1 | 3 | 3 | 3 | 3 |

EDGES: {AD,AE,BD,BE,CD,CE,DE,DF,DG,DH,EF,EG,EH}

| UNION (X:Y) | A=1 | B=2 | C=3 | D=4 | E=5 | F=6 | G=7 | H=8 | I=9 |
|---|---|---|---|---|---|---|---|---|---|
| UNION (A:B) | 0 | 0 | 0 | 1 | 0 | 0 | 0 | 0 | 0 |
| UNION (A:E) | 0 | 0 | 0 | 1 | 1 | 0 | 0 | 0 | 0 |
| UNION (B:D) | 2 | 0 | 0 | 1 | 1 | 0 | 0 | 0 | 0 |
| UNION (B:E) | 2 | 0 | 0 | 1 | 1 | 0 | 0 | 0 | 0 |
| UNION (C:D) | 2 | 3 | 0 | 1 | 1 | 0 | 0 | 0 | 0 |
| UNION (C:E) | 2 | 3 | 0 | 1 | 1 | 0 | 0 | 0 | 0 |
| UNION (D:E) | 2 | 3 | 0 | 1 | 1 | 0 | 0 | 0 | 0 |
| UNION (D:F) | 2 | 3 | 0 | 1 | 1 | 3 | 0 | 0 | 0 |
| UNION (D:G) | 2 | 3 | 0 | 1 | 1 | 3 | 3 | 0 | 0 |
| UNION (D:H) | 2 | 3 | 0 | 1 | 1 | 3 | 3 | 3 | 0 |
| UNION (E:F) | 2 | 3 | 0 | 1 | 1 | 3 | 3 | 3 | 0 |
| UNION (E:G) | 2 | 3 | 0 | 1 | 1 | 3 | 3 | 3 | 0 |
| UNION (E:H) | 2 | 3 | 0 | 1 | 1 | 3 | 3 | 3 | 0 |

EDGES: {AD,AE,BD,BE,CD,DF,DG,DH,EF,EG,EH,GI}

| UNION (X:Y) | A=1 | B=2 | C=3 | D=4 | E=5 | F=6 | G=7 | H=8 | I=9 |
|---|---|---|---|---|---|---|---|---|---|
| UNION (A:B) | 0 | 0 | 0 | 1 | 0 | 0 | 0 | 0 | 0 |
| UNION (A:E) | 0 | 0 | 0 | 1 | 1 | 0 | 0 | 0 | 0 |
| UNION (B:D) | 2 | 0 | 0 | 1 | 1 | 0 | 0 | 0 | 0 |
| UNION (B:E) | 2 | 0 | 0 | 1 | 1 | 0 | 0 | 0 | 0 |
| UNION (C:D) | 2 | 3 | 0 | 1 | 1 | 0 | 0 | 0 | 0 |
| UNION (D:F) | 2 | 3 | 0 | 1 | 1 | 3 | 0 | 0 | 0 |
| UNION (D:G) | 2 | 3 | 0 | 1 | 1 | 3 | 3 | 0 | 0 |
| UNION (D:H) | 2 | 3 | 0 | 1 | 1 | 3 | 3 | 3 | 0 |
| UNION (E:F) | 2 | 3 | 0 | 1 | 1 | 3 | 3 | 3 | 0 |
| UNION (E:G) | 2 | 3 | 0 | 1 | 1 | 3 | 3 | 3 | 0 |
| UNION (E:H) | 2 | 3 | 0 | 1 | 1 | 3 | 3 | 3 | 0 |
| UNION (G:I) | 2 | 3 | 0 | 1 | 1 | 3 | 3 | 3 | 3 | ps
METHOD AND APPARATUS FOR DIAGNOSING HOST TO STORAGE DATA PATH LOSS DUE TO FIBRECHANNEL SWITCH FABRIC SPLITS

FIELD OF THE INVENTION

The invention relates generally to distributed systems, and more particular to a method and apparatus for diagnosing switch operations in FibreChannel networks.

BACKGROUND OF THE INVENTION

As distributed systems continue to increase in size and capacity through the introduction of additional equipments or additional interconnections between equipments or components, the need to manage and determine the status of the distributed system becomes increasingly more difficult and complex.

In distributed systems, such as storage area networks (SANs), a plurality of data providers/users are typically connected through a FibreChannel switch fabric to a plurality of storage devices. The FibreChannel switch fabric typically includes a plurality of switches that allow any data provider to supply data to one or more storage devices and similarly enables a storage device to provide stored data to each of the data users. The providers/users have no explicit knowledge of which of the storage devices to which the data is stored or provided. As additional storage devices are added to the plurality of storage devices or new switches are added to the fabric, the interconnections within the switch fabric are updated to accommodate the new equipments. FIG. 1 illustrates a conventional Storage Area Network which illustrates a plurality of hosts 110 in communication with a plurality of switches 120 which provide access to a network 130. The network represents an internal or external communication network (e.g., private or public internet) or may represent a switch fabric. In essence, the specific communication paths among the elements of the network are unknown to a user (host). Accordingly, information provided to the network 130 from host 110 may be stored on selected storage devices 150 via switches 140. The data may, for example, include header information that identifies the specific storage device to which data is stored or retrieved.

Because of the number of interconnections (paths, pathlinks) between the switches and the external data providers/users and the storage area network devices, there is an inherent redundancy in the SAN as data may be provided to any one of the storage devices that are indicated to be in an operational state. That is, if one particular storage device fails by losing power or component breakdown, a SAN controller may receive an indication of the non-operational status may declare the device failed and direct subsequent requests for storing data to another storage device. Similarly, when a switch fails, the SAN controller may declare the device failed and direct subsequent requests to the switch to another switch.

However, when a connection between a host and a storage device fails due to a link or switch failure in the SAN, there is no explicit indication of such a failure. One way to determine whether connections have failed, and provide subsequent re-routing information, is to test each connection by physically transmitting signal and determining a reply. This method is very time consuming and expensive as the test signals must be transmitted without interfering with the underlying operation of the SAN.

Hence, there is a need in the industry for a method and apparatus for determining the interconnections among a plurality of equipments and utilizing this information to determine connectivity between equipments or components in the distributed system.

SUMMARY OF THE INVENTION

A method, apparatus and computer-program product for determining the status of a connection among a plurality of elements in a distributed system is disclosed. The method comprising the steps of determining an initial configuration of the connections among selected ones of the plurality of elements as a relationship of one of said selected elements to another of said elements, wherein at least one of said relationships is associated with a root element of an associated connection, responsive to a stimulus, determining a second configuration of the connections among the selected elements, determining a current condition of the connections among the selected elements is based on at least the second configuration; and providing an indication when at least a significant change has occurred. The device discloses, in one aspect, a processor executing code for implementing the method steps described and the computer product providing code to a processor for implementing the method steps described.

DETAILED DESCRIPTION OF THE FIGURES

FIG. 3 illustrates a flow chart of a conventional Find algorithm;

Figure 1:
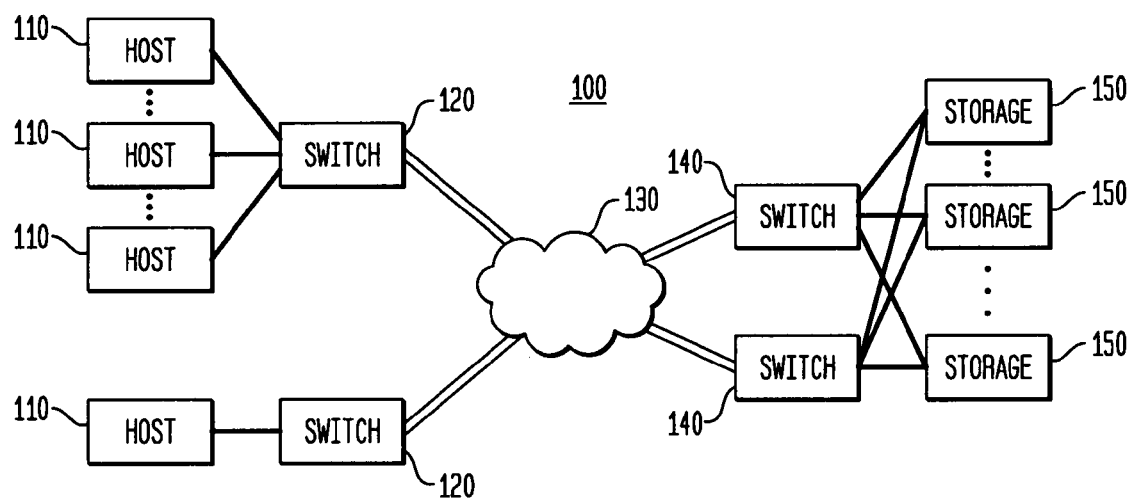
FIG. 1 illustrates an exemplary Storage Area Network.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

Switching fabrics naturally lend themselves to graphical analysis. In this context, graph is a mathematical object—a collection of vertices and edges. Vertices are essentially the nodes and the edges are the connections between nodes. Edges are named by vertex pairs (example, AC is an edge that implies there is a connection between vertex A and C).

Prior to providing a description of the present invention, terminology with regard to Storage Area Networks is provided:

SAN (Storage Area Network)—A discrete network that transfers data between host servers and storage systems (disk arrays, tape libraries, and others) via serial I/O rather than network protocols. A SAN built on Fibre Channel equipment uses the FC, FCIP, or iFCP storage protocol, and a SAN built on Ethernet equipment uses the iSCSI storage protocol. The SAN introduces the flexibility of networking to enable one server or many heterogeneous servers to share a common pool of storage. The storage resources are shared by the servers, rather than being dedicated to any one server. A SAN centralizes storage management, which simplifies administration and allows storage resources to be used more efficiently.

Data Path—In a SAN, a logical representation of the connection between a host physical device on a host server and an array storage volume on a networked storage system. The data path may traverse any of the logical links that are present on the host server going to the storage system. In fact, redundant logical links is one of the mechanisms for ensuring that the data remains accessible when connectivity failures occur in the network. Note that the host server "sees" a physical device as an I/O path to an internal physical disk (or disks), but in most cases a host physical device is actually a mapping to an entire physical disk drive, or to a part of a physical disk drive, or to multiple disk drives on the networked storage system. Therefore, in most cases, a host physical device is actually a logical device.

E-port—Extension port on a FibreChannel switch. This port allows connectivity to another switch.

Fabric—A Fibre Channel topology with one or more switching devices.

Fabric Split—Loss of connection between two switches.

FC (FibreChannel)—Nominally a one-gigabit-per-second data transfer interface technology, although the specification allows data transfer rates from 133 megabits per second up to 4.25 gigabits per second.

FibreChannel Switch—A network device that selects a path or circuit for sending of data between destinations using the FibreChannel protocol.

HBA (Host Bus Adapter)—A physical board (and associated driver) that plugs into a host and lets the host communicate with a storage-interconnect device such as a Fibre Channel switch. Common protocols include Fibre Channel and iSCSI.

ISL (Inter-Switch Link)—A cable connection—specifically, a physical E-Port connection—between two Fibre Channel switches.

Port—A physical connecting point to which a device is attached.

SCSITargetInitiatorPath—A high-level logical representation of the path in the SAN connecting an HBA port to a Storage port. There is only one SCSITargetInitiatorPath per HBA and storage port pair. However, there can be many actual paths, within the fabric, from HBA port to storage port. It is possible for the SCSITargetInitiatorPath to go through a single switch.

Although the principles of the invention are described in detail with regard to SANs, it would be recognized by those skilled in the art that the principles described herein may be applied to other networks or distributed systems and is considered within the scope of the invention.

Figure 2:
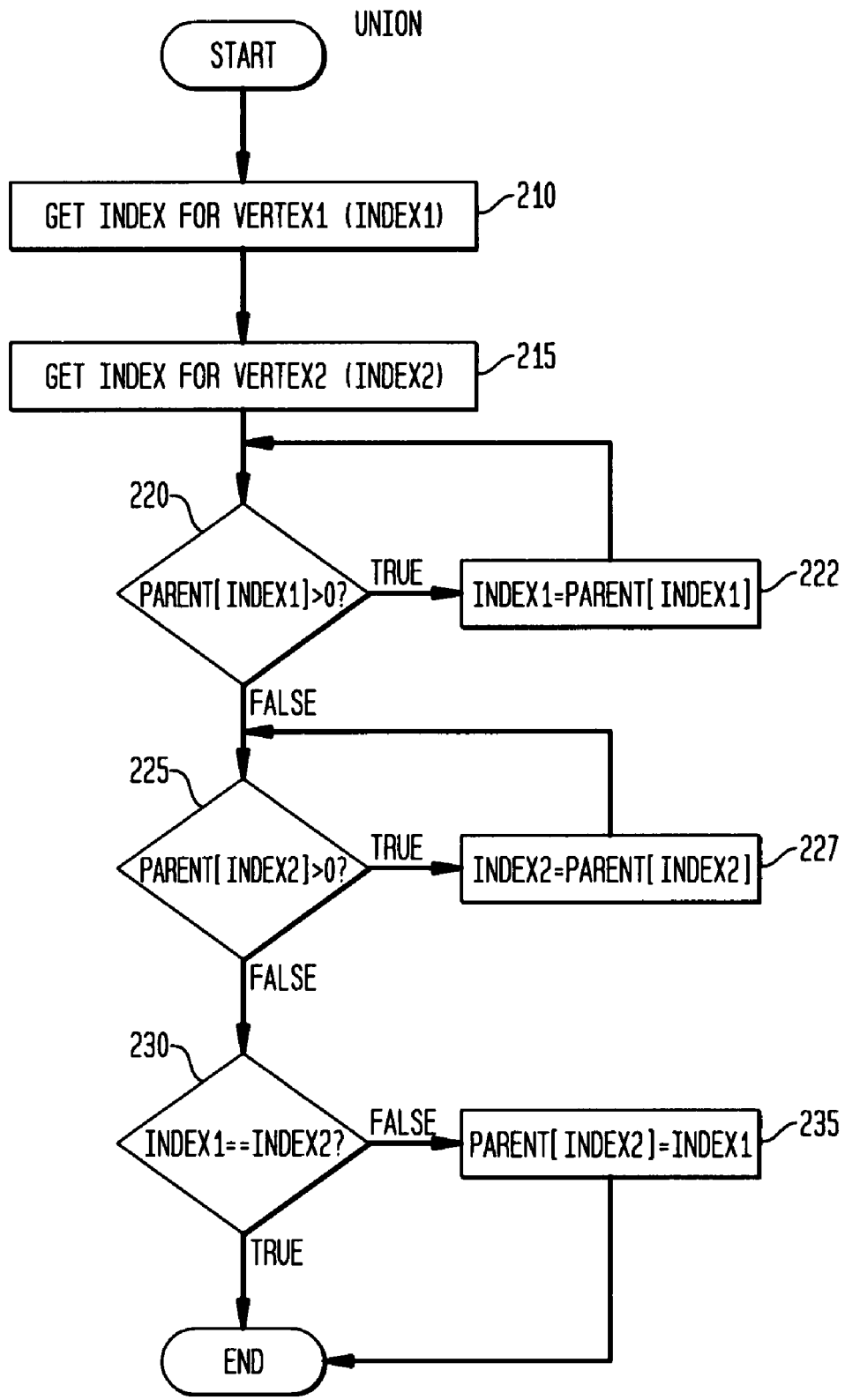
FIG. 2 illustrates a flow chart of a conventional Union algorithm.

FIG. 2 illustrates a flow chart of an exemplary process for organizing a set of nodes to determine a parent node table (i.e., a root node) for each node within a network. This process is conventionally referred to as a Union Algorithm. In this illustrated process, the first and second nodes (vertices) are obtained at steps 210 and 215. At step 220 a determination is made whether the parent entry associated with the first vertex or node is non-zero. If the answer is in the affirmative, then the value of the parent entry associated with the first vertex is set to the value (index) associated with the first vertex at step 222.

However, if the answer is negative, then a determination is made at block 225 as to whether the parent entry associated with the second vertex is non-zero. If the answer is in the affirmative, then the value of the parent entry associated with the second vertex is set to the value (index) associated with the second vertex at step 227.

Otherwise, a determination is made at block 230 whether the same node is being processed (i.e., index 1 equals index 2). If the answer is in the negative then the value of the parent entry associated with the second vertex is set to the value (index) associated with the first vertex at block 235.

FIG. 3 illustrates a flow chart of an exemplary process for determining whether two given nodes are related (or connected) based on the parent table. This process is conventionally referred to as a Find Algorithm. In this illustrated example, values associated with a first and second vertex are obtained at blocks 250 and 255, respectively. At block 260 a determination is made whether the parent entry associated with the first vertex or node is non-zero. If the answer is in the affirmative, then the value of the parent entry associated with the first vertex is set to the value (index) associated with the first vertex at block 265.

However, if the answer is negative, then a determination is made at block 270 as to whether the parent entry associated with the second vertex is non-zero. If the answer is in the affirmative, then the value of the parent entry associated with the second vertex is set to the value (index) associated with the second vertex at block 275.

Otherwise, a value of True is set if the values associated with the first and second vertices are the same at block 280.

Figures 4A, 4B:
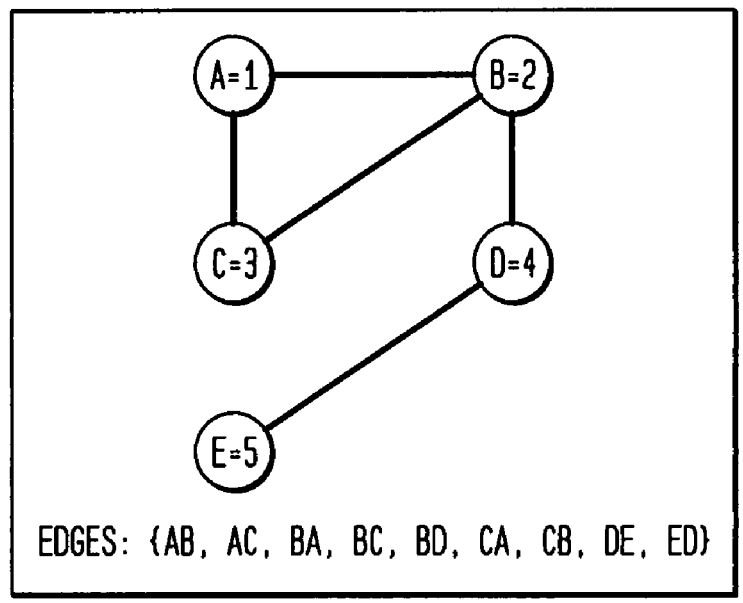
FIGS. 4A and 4B illustrate an exemplary application of the processing shown in FIG. 2A.

FIG. 4A illustrates an exemplary network composed of 5 nodes or vertices labeled A-E, respectively. Further, each node is identified by an associated index value, A=1, B=2, etc. Node A is connected to nodes B and C, node B is connected to nodes C and D and node D is connected to node E. The connections are referred to as edges and are referred to as AB, AC, BA, BC, BD, CA, CB, DE and ED. FIG. 4B illustrates the parent table as the nodes and edges are evaluated in accordance with the processing shown in FIG. 2A.

In the parent table shown in FIG. 4B, the rows represent the union of two nodes, i.e., the connection between two nodes, and each column is associated with one of the nodes or vertices of the network illustrated in FIG. 4A. The last row represents the accumulated evaluation of the connections among the nodes is referred-to as the parent table.

FIG. 4B illustrates the progressive creation of the parent table, as each vertex connection is evaluated and added. For example, the root node of node B is node A. Similarly, the root node of the union between nodes A and C is node A. After all edges have been evaluated and added, the parent table indicates that the vertex or node associated with index 1 (node A) is the parent of the remaining nodes.

Using the parent table, it can be easily determined whether node E is connected to C by determining E's parent is node A, which also happens to be the root and node C's parent is also A. Hence the two nodes are connected.

Figures 5A, 5B:
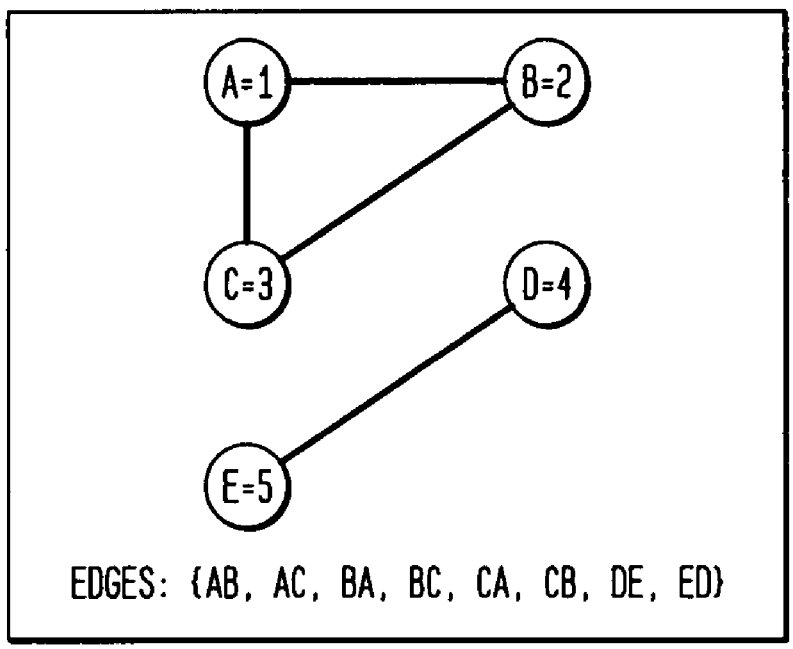
FIGS. 5A and 5B illustrate a second exemplary application of the processing shown in FIG. 2A.

FIGS. 5A and 5B illustrate a second example of the application of the processing shown in FIG. 2. In FIG. 5A, no connection exists between nodes B and D or C and D. Referring to the constructed parent table in FIG. 5B, it can be determined whether nodes E and C are connected. In this case, node E's parent is node D, which is one of the roots, and node C's parent is A, which is one of the other roots. As the roots of nodes E and C are not the same, these nodes are not connected.

Figure 6A:
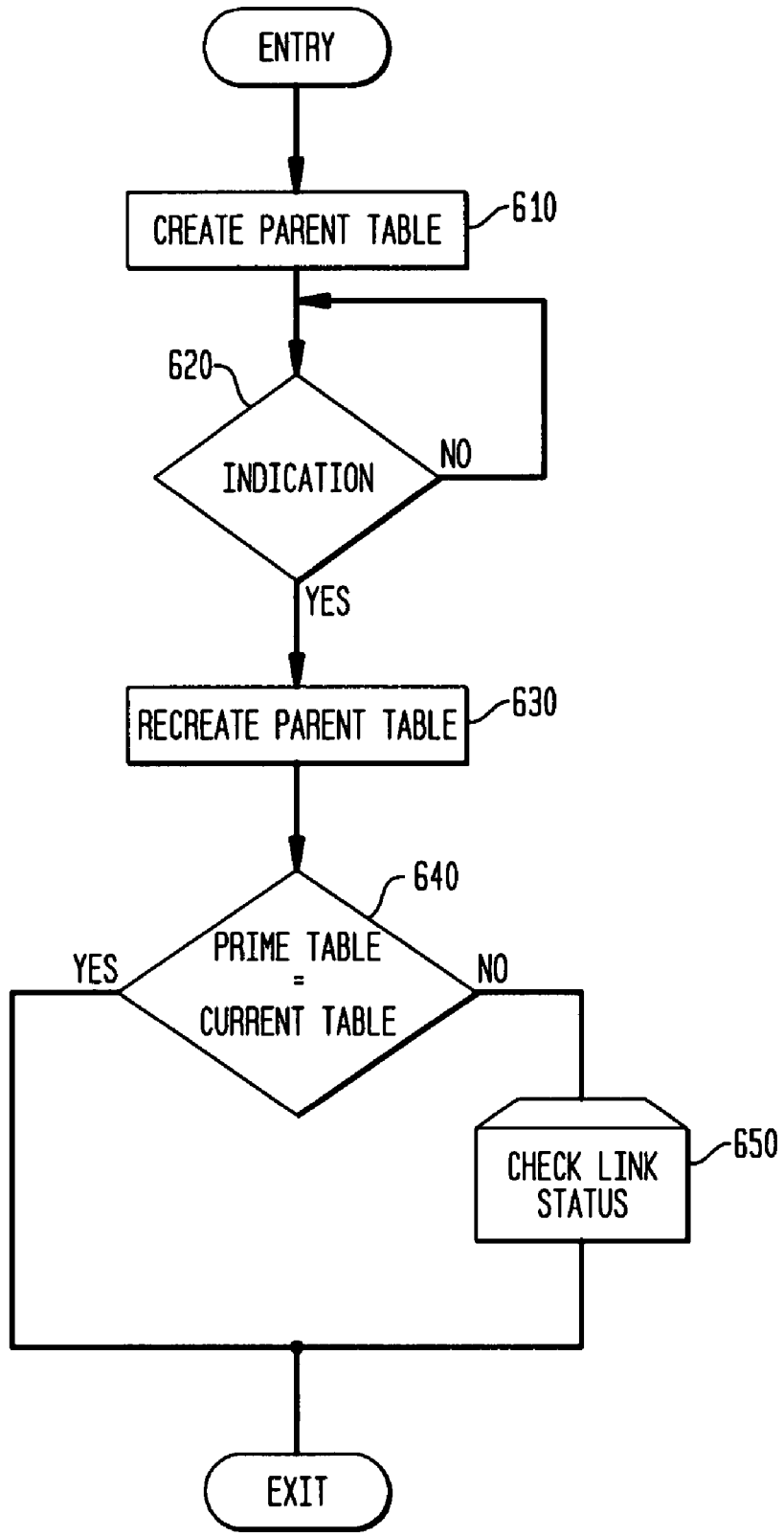
FIG. 6A illustrates a flow chart of an exemplary process for determining network node connections in accordance with the principles of the invention.
Figure 7A:
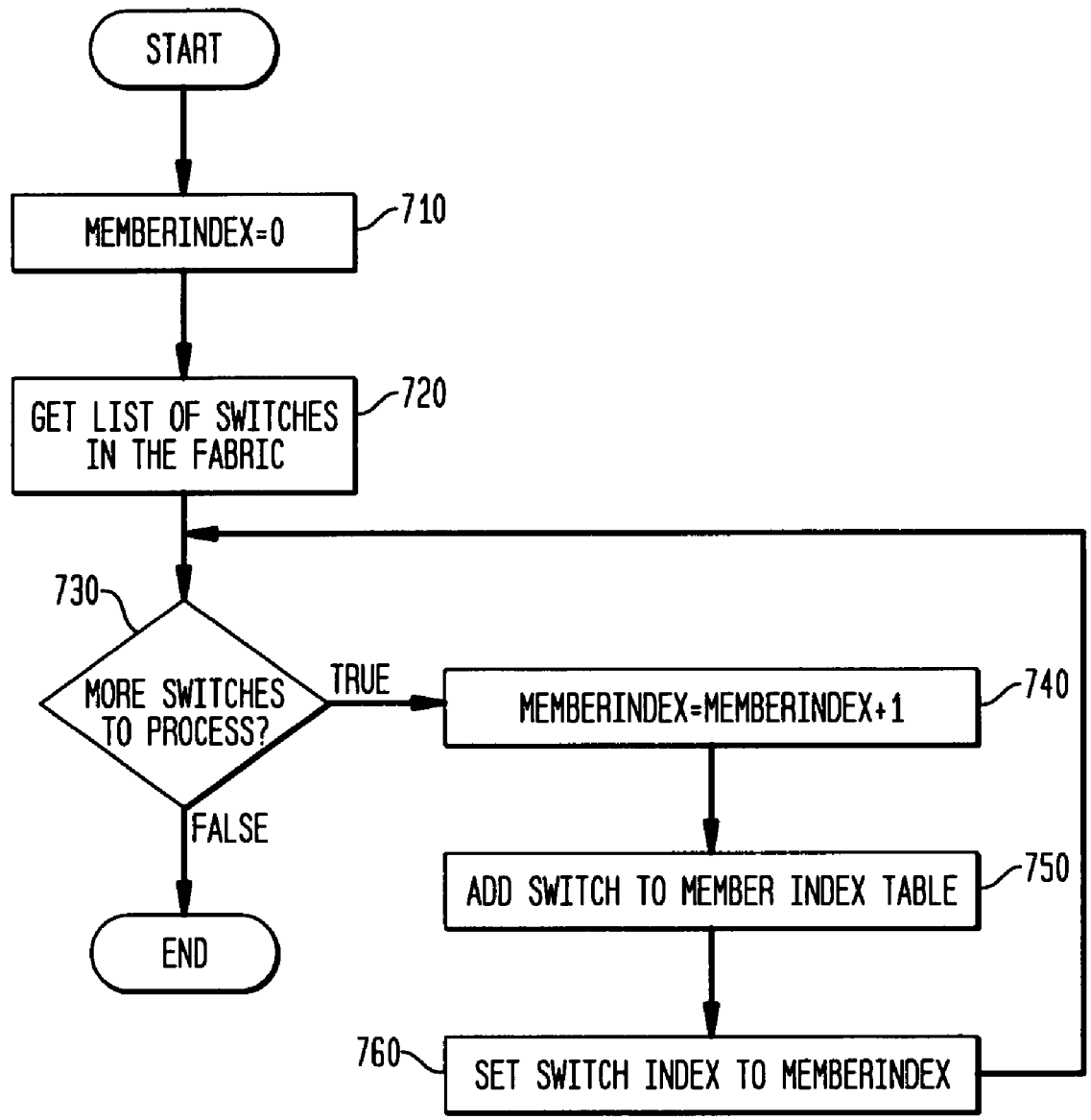
FIGS. 7A and 7B illustrate flow charts of exemplary processes for assigning and identifying network elements in accordance with the principles of the invention.
Figure 7B:
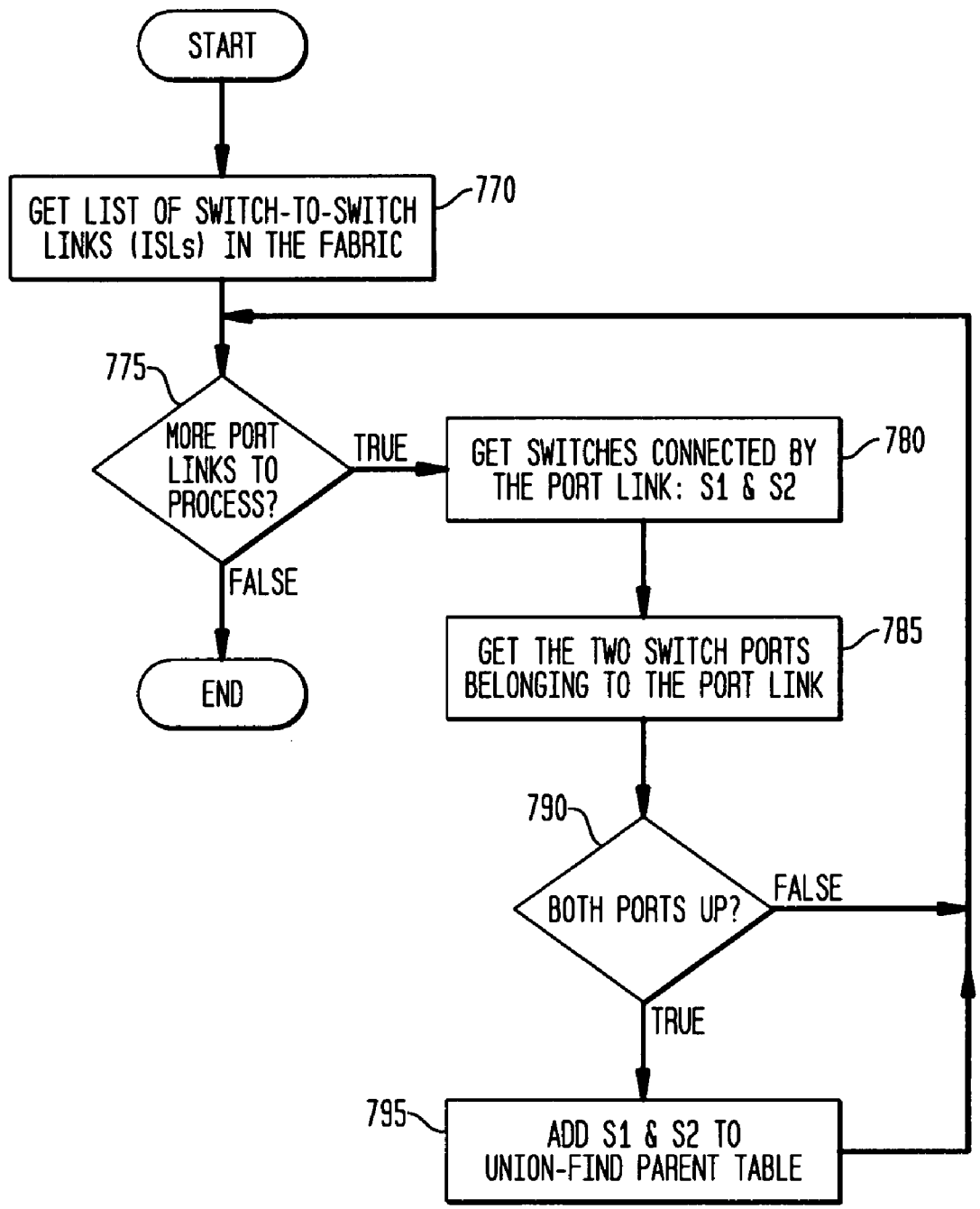

FIG. 6A illustrates a flowchart of a first exemplary process for determining status of network connections in accordance with the principles of the present invention. In this illustrated case, network nodes are sequentially identified at block 610 and stored in a parent table. Processing for the identification of nodes and creation of the parent table is shown in FIGS. 7A and 7B. At block 620, a determination is made whether an indication or stimulus has been received which indicates a potential error or a disruption in the network. For example, the loss of a node or failure of a path between nodes may indicate a potential error or disruption in the network. When an indication of a potential error or a disruption in the network is detected, the parent table is recreated at block 630. At block 640, a determination is made whether a change has occurred between the parent table created at block 610 and the parent table at block 630. If a difference has occurred the link status is checked at block 650. Link status may be determined based on the processing shown in FIG. 3. In addition, the comparison of the parent tables may further indicate a significant change has occurred, as will be described with regard to FIGS. 9A-11B.

Figure 6B:
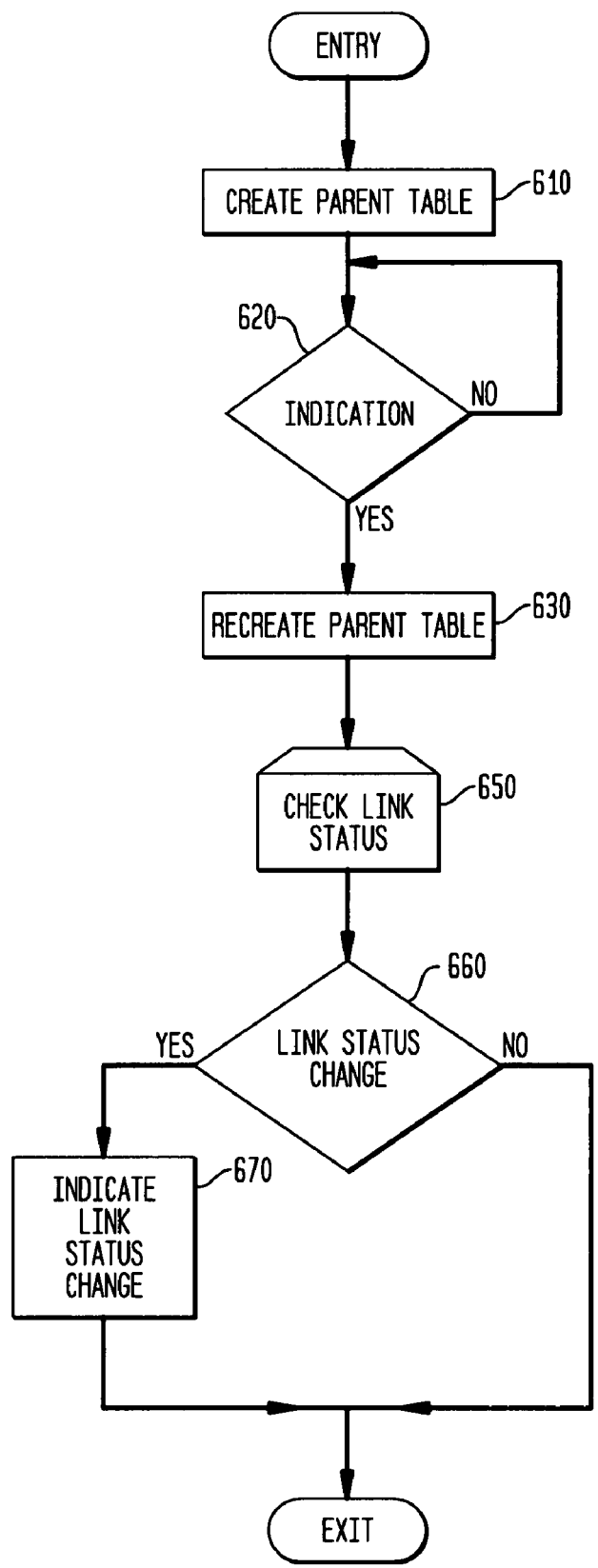
FIG. 6B illustrates a flow chart of a second exemplary process for determining network node connections in accordance with the principles of the invention.

FIG. 6B illustrates a flow chart of a second exemplary processing in accordance with the principles of the invention. In this exemplary processing, parent tables are created as previously described in steps 610 and 630 of FIG. 6A. After creating the parent table at step 630, the link status is checked at step 650. After the status of all the links are checked, a determination is made at block 660, whether a link status change is indicated. If the answer is in the affirmative, an indication is generated to signify the determined link status change at block 670.

Referring to FIG. 7A, network nodes are identified by obtaining a list of the switches or nodes in the switch fabric or network at block 720. At block 730 a determination is made whether there are any additional switches to be processed. If the answer is in the affirmative, then a count of the number of members is incremented at block 740, the associated switch is added to the index table (block 750) and the switch identification is set to the current, value of the number of members (block 760). Processing returns to block 730 to continue processing until all switches are identified.

FIG. 7B represents an exemplary process for constructing a parent table in accordance with the principles of the invention. In this illustrated process, a list of switch-to-switch links is obtained at block 770. At block 775 a determination is made whether more port links are to be processed. If the answer is in the affirmative, the identification values associated with each of two switches connected by a port link are obtained at block 780. At block 785, the specific ports of each switch associated with the port link are obtained. At block 790, a determination is made whether the port(s) are active (i.e., up). If the answer is in the affirmative, the identification values associated with each of the two switches are added to the parent table at step 795. Processing continues at block 775 until each of the switches is processed.

As would be recognized by those skilled in the art, the port link between two switches may be comprised of a plurality of links as each switch may include a plurality of ports. Accordingly, the processing shown herein would be repeated for each physical connection between the ports of the two switches. Such multiple physical connections is referred-to herein as a port link and, hence, the processing shown in FIG. 7A is repeated for each such physical connection. When at least one of the physically connects is indicated to be "Up" or operational, then the edge (i.e., switch-to-switch connection) is added to the parent table.

Figure 8:
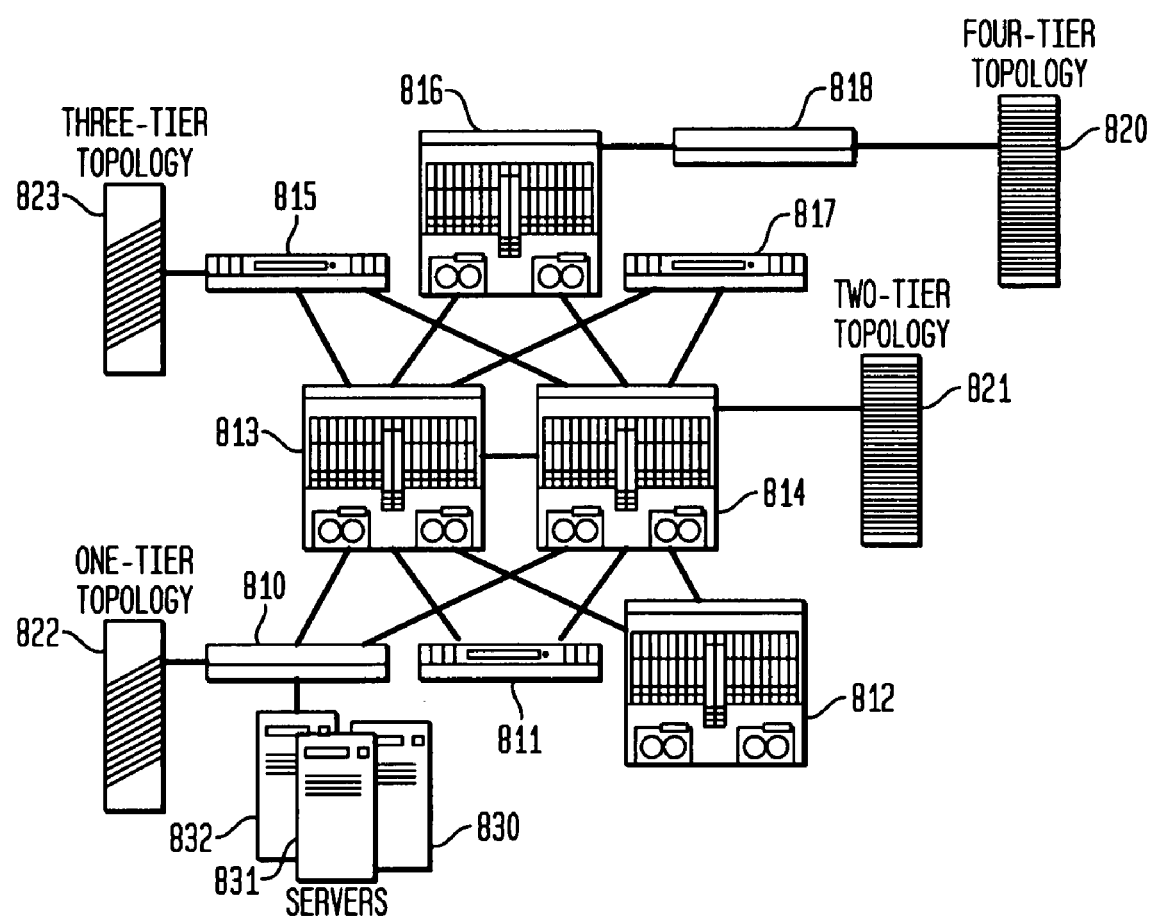
FIG. 8 illustrates an exemplary SAN including a switch fabric.

FIG. 8 illustrates an exemplary network for further illustrating the processing shown herein. In this exemplary network, there are 9 switches, 810-818, four storage arrays (820-823) and a plurality of hosts (830-832). Host 830, for example, may provide data to or retrieve data from, any of the storage devices 820-823 via the switches 810-818.

Figures 9A, 9B:
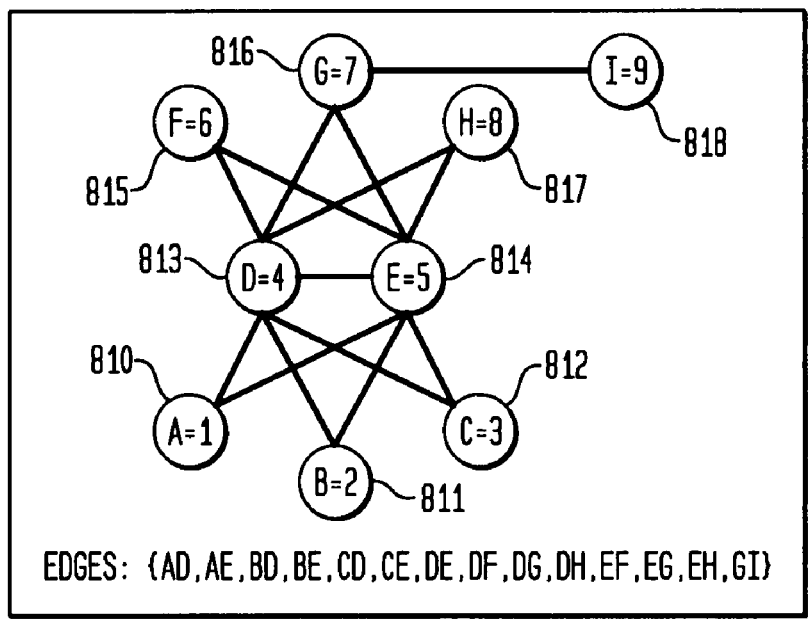
FIGS. 9A and 9B illustrate an application of the instant invention to the network shown in FIG. 8.

FIG. 9A illustrates an abstraction of the switch fabric or network shown in FIG. 8 and associated identification of the switch elements (node) in the switch fabric. The nodes are identified as described in. FIG. 7A, wherein node A=1, B=2 . . . I-9. Using the processing shown in FIG. 7B, a parent table may be determined as illustrated in FIG. 9B. FIG. 9B as previously described, represents the state of the parent table as each node is added to the parent table. Accordingly, the last line illustrated in FIG. 9B represents the final state of the parent table. In this case node C represents the root node and a connection can be found from node D=4, through nodes A=1 and B=2.

Utilizing the parent table of FIG. 9B can be determined whether node A=1 is connected to node I=9, for example. In this case, the parent of node A (index=1) is node B (=2), and node B's parent is node C (=3), which happens to be the root node. Referring to node I (=9), its parent node is node C (=3). Accordingly, the two switches are connected.

Figures 10A, 10B:
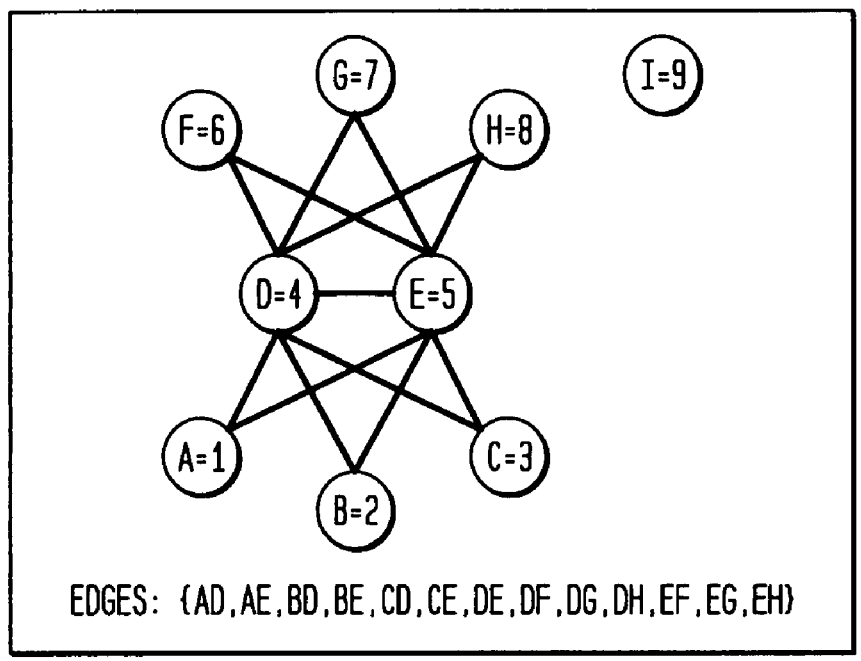
FIGS. 10A and 10B illustrate a second application of the instant invention to the network shown in FIG. 8.

FIGS. 10A and 10B illustrate a second example of the processing described herein, wherein a connection to node I=9 is either not implemented correctly or is not operational. In this case, the nodes are again identified and the parent table is determined as previously described. FIG. 10B illustrates the resultant parent table. In this case, nodes C and I are determined to be root nodes. To determine whether nodes A=1 and I=9 are connected, the parent table is viewed to determine that the parent of node A (=1) is C (=3), as previously described and that node I (=9), it is its own root. Hence, nodes A and I are not connected. It can further be shown that node I (=9) is not connected to any of the remaining nodes.

In this case, such a determination of node I (=9) not being connected to the remaining nodes indicates a significant change has occurred as the storage unit 820 (FIG. 8) is no longer accessible by any of the hosts 830-832.

Figures 11A, 11B:
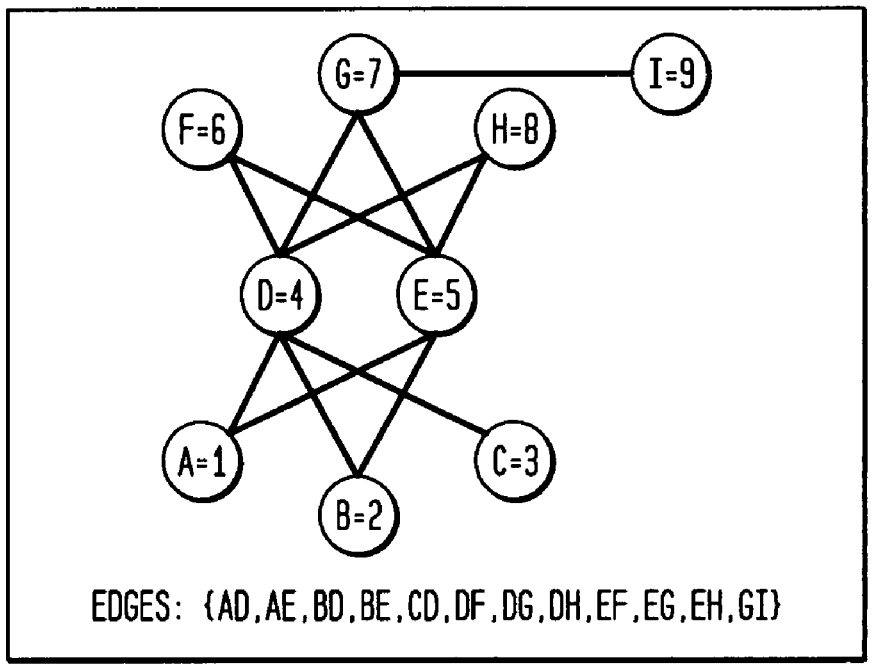
FIGS. 11A and 11B illustrate another application of the instant invention to the network shown in FIG. 8.

FIGS. 11A and 11B illustrate another example of a missed or faulty connection between nodes (D and E, and E and C). FIG. 11B illustrates the parent table constructed based on the connections between the nodes shown in FIG. 11A. In this case, although no direct connection exists between nodes D and E, and C and E, it can be readily determined that node C is as root node (i.e., associated value equals zero) and the parent of node E (=5), is also node C (=3), through the sequential relationships between nodes A and B (i.e., E related to A, which is related to B, which is related to C. Hence, E and C are connected via some path in the fabric. Similarly it can be determined that nodes D and E are connected as the parent of node D (=4) is C (=3) and node E's parent is also node C. Therefore, nodes D and E are connected through the sequential relationship among nodes A, B and C. Accordingly, in this case, the failures in the links between nodes C, D and E may be considered non-significant or minor as data may continued to be routed among each of the nodes. In this case, an indication of such information (an indication) may be provided to another system or not provided to another system.

Thus, in accordance with one aspect of the present invention, it can be quickly determined whether an indication of error or disruption in the network by comparing the parent tables and if desired determining specific path link failures. (see FIG. 6A).

As would be recognized embodiments of the present application disclosed herein include software programs to implement the embodiment and operations disclosed herein. For example, a computer program product including a computer-readable medium encoded with computer program logic (software in a preferred embodiment). The logic is configured to allow a computer system to execute the functionality described above. One skilled in the art will recognize that the functionality described may also be loaded into conventional computer memory and executed by a conventional CPU. The implementations of this invention may take the form, at least partially, of program code (i.e., instructions) embodied in tangible media, such as floppy diskettes, CD-ROMs, hard drives, random access or read only-memory, or any other machine-readable storage medium or downloaded from one or more network connections. When the program code is loaded into and executed by a machine, such as a computer, the machine becomes an apparatus for practicing the invention. The implementations of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the functionality or processes described herein reconfigures a general purpose digital computer into a special purpose digital computer enabled for implementing the functionality discussed herein. When implemented on a general-purpose processor, the program code combines with the processor of the computer to provide a unique apparatus that operates analogously to specific logic circuits.

One more particular embodiment of the present application is directed to a computer program product that includes a computer readable medium having instructions stored thereon for supporting management and viewing of configurations associated with a storage area network. The instructions, when carried out by a processor of a respective computer device, cause the processor to facilitate application deployment configuration.

Figure 12:
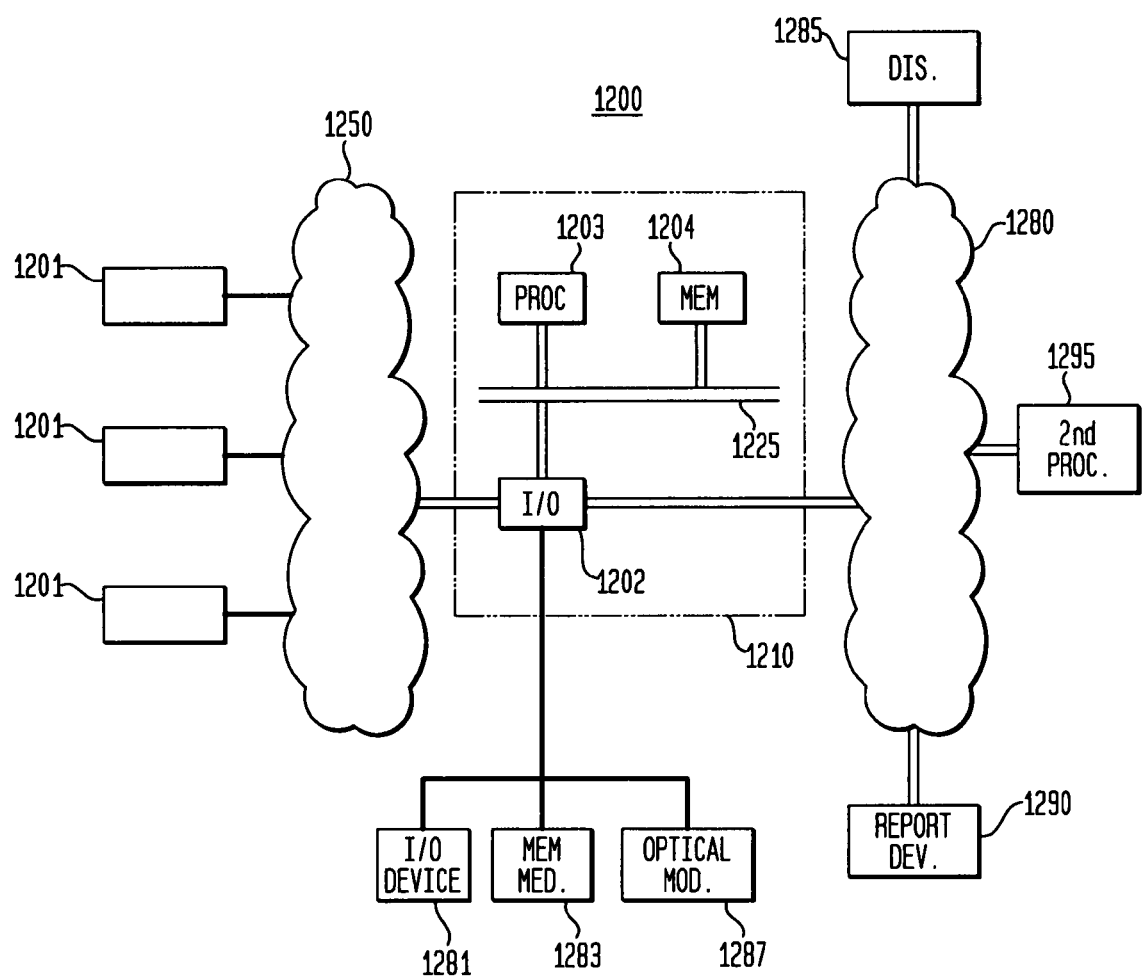
FIG. 12 illustrates a system implementing the processing shown herein.

FIG. 12 illustrates an exemplary embodiment of a system 1200 that may be used for implementing the principles of the present invention. Device 1210 may contain one or more input/output devices 1202, processors 1203 and memories 1204. I/O devices 1202 may access or receive information from one or more sources or devices 1201. Sources or devices 1201 may be devices such as routers, servers, computers, notebook computer, PDAs, cells phones or other devices suitable for transmitting and receiving information responsive to the processes shown herein. Devices 1201 may have access over one or more network connections 1250 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 1202, processors 1203 and memories 1204 may communicate over a communication medium 1225. Communication medium 1225 may represent, for example, a bus, a communication network, one or more internal connections of a circuit, circuit card or other apparatus, as well as portions and combinations of these and other communication media. Input data from the sources or client devices 1201 is processed in accordance with one or more programs that may be stored in memories 1204 and executed by processors 1203. Memories 1204 may be any magnetic, optical or semiconductor medium that is loadable and retains information either permanently, e.g. PROM, or non-permanently, e.g., RAM. Processors 1203 may be any means, such as general purpose or special purpose computing system, such as a laptop computer, desktop computer, a server, handheld computer, or may be a hardware configuration, such as dedicated logic circuit, or integrated circuit. Processors 1203 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 1204. The code may be read or downloaded from a memory medium 1283, an I/O device 1281 or magnetic or optical media, such as a floppy disk, a CD-ROM or a DVD, 1287 and then stored in memory 1204. In another aspect, the code may be downloaded, for example, over one or more of the illustrated networks. As would be appreciated, the code may be processor-dependent or processor-independent. JAVA is an example of processor-independent code. JAVA is a trademark of the Sun Microsystems, Inc., Santa Clara, Calif. USA.

Information from device 1201 received by I/O device 1202, after processing in accordance with one or more software programs operable to perform the functions illustrated herein, may also be transmitted over network 1280 to one or more output devices represented as display 1285, reporting device 1290 or second processing system 1295.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A computer implemented method for determining the status of a connection among a plurality of elements in a distributed system, wherein the plurality of elements comprises nodes of a network, the method comprising the steps of:
   determining an initial configuration of the connections among selected ones of the plurality of elements as a relationship of one of said selected elements to another of said elements, by creating a first parent table, wherein the first parent table denotes a root node for each node within a network, the column headings of the first parent table represent each selected node in the network and the column values of the first parent table represent the root node for that selected node, and the first parent table row represents the union of two nodes of said plurality of elements; wherein the union is associated with the connectivity of the two nodes;
   responsive to a stimulus, determining a second configuration of the connections among the selected elements, by creating a second parent table, wherein the second parent table denotes a root node for each node within the network, the column headings of the second parent table represent each selected node in the network and the column values of the second parent table represent the root node for that selected node, and the second parent table row represents the union of two nodes of said plurality of elements; wherein the union is associated with the connectivity of the two nodes;
   determining a current condition of the connections among the selected elements is based on at least the second configuration; and
   providing an indication when a significant change has occurred; wherein a significant change, based on a comparison of said first parent table and said second parent table, indicates an element of said plurality of elements has had a change in the number of connections for the element and is not connected to at least one other element;
   wherein the steps are executed by a computing device.

2. The method as recited in claim 1, further comprising the step of:
   providing an indication when at least a non-significant change has occurred; where a non-significant change indicates, based on the parent table, that at least one element of the plurality of elements has had a change in the number of direct connections for the at least one element.

3. The method as recited in claim 2, further comprising the step of: determining the status of each of the connections.

4. The method as recited in claim 1, wherein the step of determining a current condition comprises the step of:
   determining the status of each of the connections.

5. An apparatus for determining the status of a connection among a plurality of elements in a distributed system, wherein the plurality of elements comprise nodes of a network, the apparatus comprising:
   means for determining an initial configuration of the connections among selected ones of the plurality of elements as a relationship of one of said selected elements to another of said elements, by creating a first parent table, wherein the first parent table denotes a root node for each node within a network, the column headings of the first parent table represent each selected node in the network and the column values of the first parent table represent the root node for that selected node, and the first parent table row represents the union of two nodes of said plurality of elements; wherein the union is associated with the connectivity of the two nodes;
   means responsive to a stimulus, for determining a second configuration of the connections among the selected elements, by creating a second parent table, wherein the second parent node table denotes a root node for each node within the network, the column headings of the second parent table represent each selected node in the network and the column values of the second parent table represent the root node for that selected node, and the second parent table row represents the union of two nodes of said plurality of elements; wherein the union is associated with the connectivity of the two nodes;
   means for determining a current condition of the connections among the selected elements is based on at least the second configuration; and means for providing an indication when a significant change has occurred;
   wherein a significant change, based on a comparison of said first parent table and said second parent table, indicates an element of said plurality of elements has had a change in the number of connections for the element and is not connected to at least one other element; wherein at least one of the means comprises a computing device.

6. The apparatus as recited in claim 5, further comprising:
   means for providing an indication when at least a non-significant change has occurred; where a non-significant change indicates, based on the parent table, that at least one element of the plurality of elements has had a change in the number of direct connections for the at least one element.

7. The apparatus as recited in claim 5, further comprising: means for determining the status of each of the connections.

8. The apparatus as recited in claim 5, wherein the step of determining a current condition comprises the step of:
   determining the status of each of the connections.

9. The apparatus as recited in claim 5, wherein said means is a processing unit accessing and executing computer code stored in a memory.

10. The apparatus as recited in claim 5, wherein said means is a special purpose circuit for executing instructions.

11. A computer-program product, comprising a non-transitory medium encoded with computer executable program code for determining the status of a connection among a plurality of elements in a distributed system, wherein the plurality of elements comprise nodes of a network, and execution of the computer executable program code enables a computer device to execute the steps of:
   determining an initial configuration of the connections among selected ones of the plurality of elements as a relationship of one of said selected elements to another of said elements, by creating a first parent table, wherein the first parent table denotes a root node for each node within the network, the column headings of the first parent table represent each selected node in the network and the column values of the first parent table represent the root node for that selected node, and the first parent table row represents the union of two nodes of said plurality of elements; wherein the union is associated with the connectivity of the two nodes;

responsive to a stimulus, determining a second configuration of the connections among the selected elements, by creating a second parent table, wherein the second parent table denotes a root node for each node within the network, the column headings of the second parent table represent each selected node in the network and the column values of the second parent table represent the root node for that selected node, and the second parent table row represents the union of two nodes of said plurality of elements; wherein the union is associated with the connectivity of the two nodes;

determining a current condition of the connections among the selected elements is based on at least the second configuration; and providing an indication when a significant change has occurred; wherein a significant change, based on a comparison of said first parent table and said second parent table, indicates an element of said plurality of elements has had a change in the number of connections for the element and is not connected to at least one other element.

12. The computer program product as recited in claim 11, further executing instructions to perform the step of: providing an indication when at least a non-significant change has occurred; where a non-significant change indicates, based on the parent table, that at least one element of the plurality of elements has had a change in the number of direct connections for the at least one element.

13. The computer program product as recited in claim 12, further executing instructions to perform the step of: determining the status of each of the connections.

14. The product as recited in claim 11, wherein the step of determining a current condition comprises the step of:
determining the status of each of the connections.

15. A device for determining the status of a connection among a plurality of elements in a distributed system, wherein the plurality of elements comprise nodes of a network, the device comprising:

a processor in communication with a memory, the processor executing code stored in the memory for:

determining an initial configuration of the connections among selected ones of the plurality of elements as a relationship of one of said selected elements to another of said elements, by creating a first parent table, wherein the first parent table denotes a root node for each node within the network, the column headings of the first parent table represent each selected node in the network and the column values of the first parent table represent the root node for that selected node, and the first parent table row represents the union of two nodes of said plurality of elements; wherein the union is associated with the connectivity of the two nodes;

responsive to a stimulus, determining a second configuration of the connections among the selected elements, by creating a second parent table, wherein the second parent table denotes a root node for each node within the network, the column headings of the second parent table represent each selected node in the network and the column values of the second parent table represent the root node for that selected node, and the second parent table row represents the union of two nodes of said plurality of elements; wherein the union is associated with the connectivity of the two nodes;

determining a current condition of the connections among the selected elements is based on at least the second configuration; and providing an indication when a significant change has occurred; wherein a significant change, based on a comparison of said first parent table and said second parent table, indicates an element of said plurality of elements has had a change in the number of connections for the element and is not connected to at least one other element.

16. The device as recited in claim 15, the processor further executing code for: providing an indication when at least a non-significant change has occurred; where a non-significant change indicates, based on the parent table, that at least one element of the plurality of elements has had a change in the number of direct connections for the at least one element.

17. The device as recited in claim 16, the processor further executing code for: determining the status of each of the connections.

* * * * *